United States Patent [19]

Hone

[11] 4,178,032
[45] Dec. 11, 1979

[54] APPARATUS FOR SYNCHRONOUSLY ELEVATING AND LOWERING AIR-AMBULANCE LITTER WITH CRASH ATTENUATION CAPABILITY

[75] Inventor: Horace T. Hone, Trumbull, Conn.

[73] Assignee: United Technologies Corporation, Hartford, Conn.

[21] Appl. No.: 901,881

[22] Filed: May 1, 1978

[51] Int. Cl.² .................. B60P 3/26; B64D 11/00
[52] U.S. Cl. ............................... 296/19; 5/9 R; 5/11; 187/27; 105/318; 297/216; 244/118.1
[58] Field of Search .......... 244/118 R, 118 P, 137 R, 244/137 P, 122 R; 188/1 C; 297/216; 5/9 R, 8, 81, 82, 86, 87, 11, 210; 187/27, 8.59; 296/16, 19, 17, 18, 20; 214/75 R, 83, 24, 84; 105/318

[56] References Cited

U.S. PATENT DOCUMENTS

| | | | |
|---|---|---|---|
| 1,284,936 | 11/1918 | Shine | 296/19 |
| 2,010,860 | 8/1935 | Jacobs | 296/16 |
| 2,276,998 | 3/1942 | Stollenwerk | 5/9 R |
| 3,235,106 | 2/1966 | Diehl | 187/8.59 |
| 3,606,619 | 9/1971 | Stollenwerk | 5/210 |
| 3,840,265 | 10/1974 | Stirling et al. | 296/19 |
| 4,005,765 | 2/1977 | Reilly | 188/1 C |

FOREIGN PATENT DOCUMENTS

| | | | |
|---|---|---|---|
| 322436 | 6/1902 | France | 296/19 |
| 102841 | 10/1941 | Sweden | 296/19 |
| 622624 | 5/1949 | United Kingdom | 206/19 |

Primary Examiner—Galen L. Barefoot
Attorney, Agent, or Firm—Vernon F. Hauschild

[57] ABSTRACT

Patient litter apparatus adapted for use in an air-ambulance operable to permit elevating and lowering the litter and patient while maintaining the litter in a horizontal position at all times and with provisions for locking the apparatus with the litter at a selected position of elevation, and further with provisions for attenuating a large scale force, such as that created by a down-crash of the air-ambulance, to thereby reduce the risk of injury to the patient and preserve the structural integrity of the apparatus.

9 Claims, 4 Drawing Figures

APPARATUS FOR SYNCHRONOUSLY ELEVATING AND LOWERING AIR-AMBULANCE LITTER WITH CRASH ATTENUATION CAPABILITY

The invention herein described was made in the course of or under a contract or sub-contract thereunder, with the Department of the Army.

BACKGROUND OF THE INVENTION

1. Field of the Invention

This invention relates to the loading and transporting of litter patients aboard air-ambulances and more particularly to apparatus which permits synchronous elevating or lowering of the opposite ends of the litter and/or litter support, locking the litter and/or litter support in a selected position of elevation, and protecting the patient and litter support system in the event of aircraft down-crash or other large-scale forces.

2. Description of the Prior Art

Airborne ambulances in the prior art have utilized tiers of stationary litter racks and have no mechanism to assist in the loading of the upper racks, nor do they provide crash attenuation or a means of preventing differential motion of the litter during down-crash. Such systems require an unacceptable level of man power, physical effort and loading time which may be crucial during military medical evacuation under combat conditions. Examples of such prior art are U.S. Pat. Nos. 2,370,402, 2,473,364, 2,480,322 and 3,358,300. U.S. Pat. No. 3,605,136 provides for litter elevating and lowering but uses systems of chains, gears and worms, so is unacceptably heavy for aircraft use, and provides no force attenuation.

While force attenuation is known in seat constructions, such as in U.S. Pat. Nos. 3,968,863 and 4,027,905, the teaching for force attenuation in combination with synchronous litter supporting, elevating, lowering, and locking mechanism is believed to be novel.

SUMMARY OF THE INVENTION

A primary object of this present invention is to provide a patient litter elevating and lowering apparatus for use in air-ambulances which permits both on and off loading of the patient and litter through the aircraft side doors and which provides mechanism for synchronously elevating or lowering of the head and feet of the patient and litter once so loaded to a selected elevation, at which elevation the litter may be locked in position.

It is an important teaching of the present invention that the litter elevating and lowering system have crash attenuation capabilities so as to protect the patient and the litter bearing equipment in case of an aircraft down-crash or other large scale forces.

In accordance with the present invention, a litter elevating and lowering system is provided which is simple in construction, light in weight, and which can be operated with minimum manpower and physical effort.

It is a further feature of this invention that the litter and patient are supported in level orientation at all times during the litter elevating, lowering and transporting modes.

It is an important feature of this invention that the patient bearing litter is supported from a crossed-loop continuous cable or wire reeved over four selectedly positioned pulleys to produce two vertically oriented cable portions and having litter carrying means attached thereto for synchronous vertical elevating and lowering motion therewith.

Other objects and advantages of the present invention may be seen by referring to the following description and claims, read in conjunction with the accompanying drawings.

DESCRIPTION OF THE PREFERRED EMBODIMENT

Figure 1:
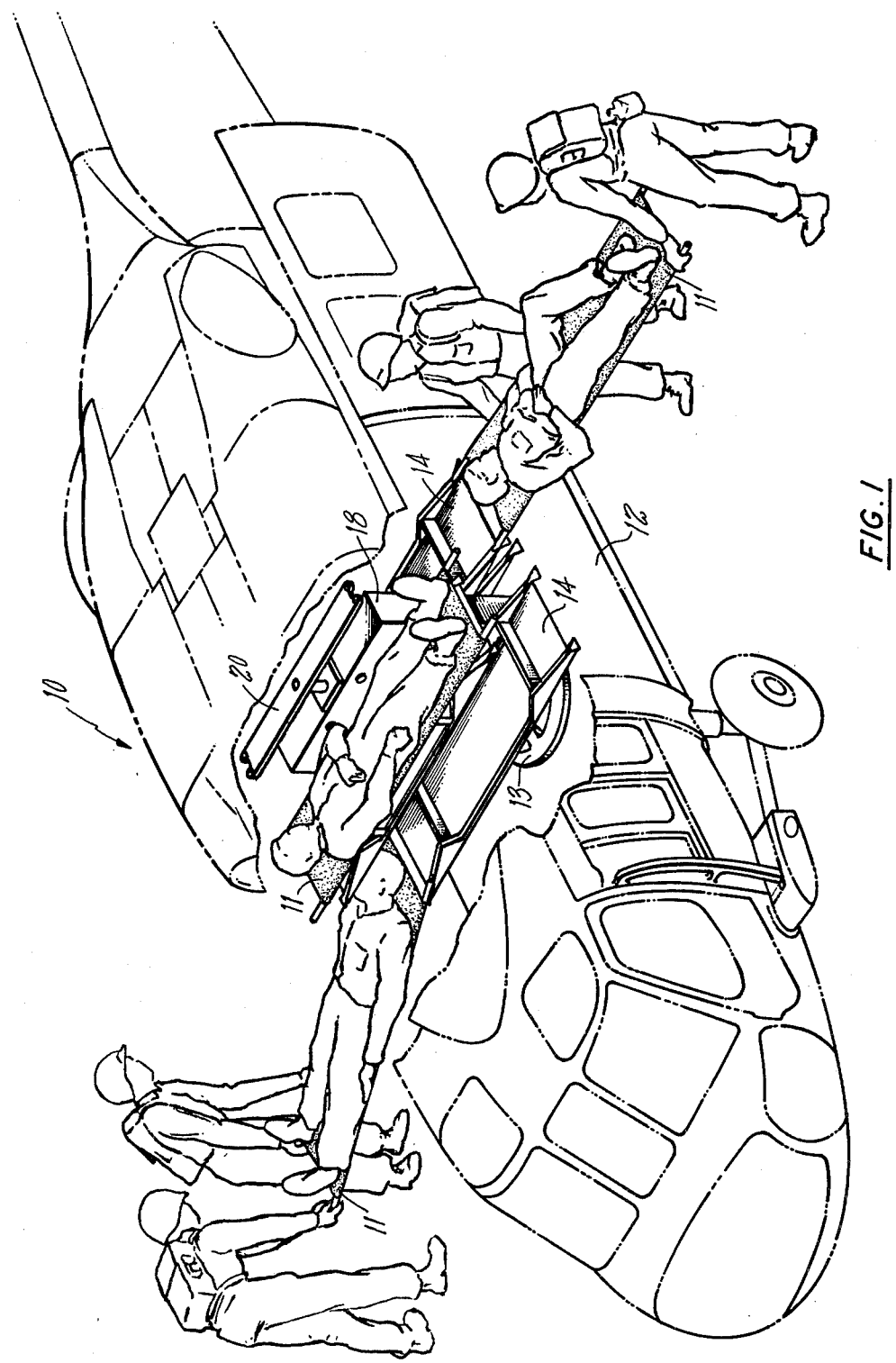
FIG. 1 is a showing of an aircraft, partially broken away, to illustrate the on-loading or off-loading of littered patients utilizing my invention.
Figure 2:
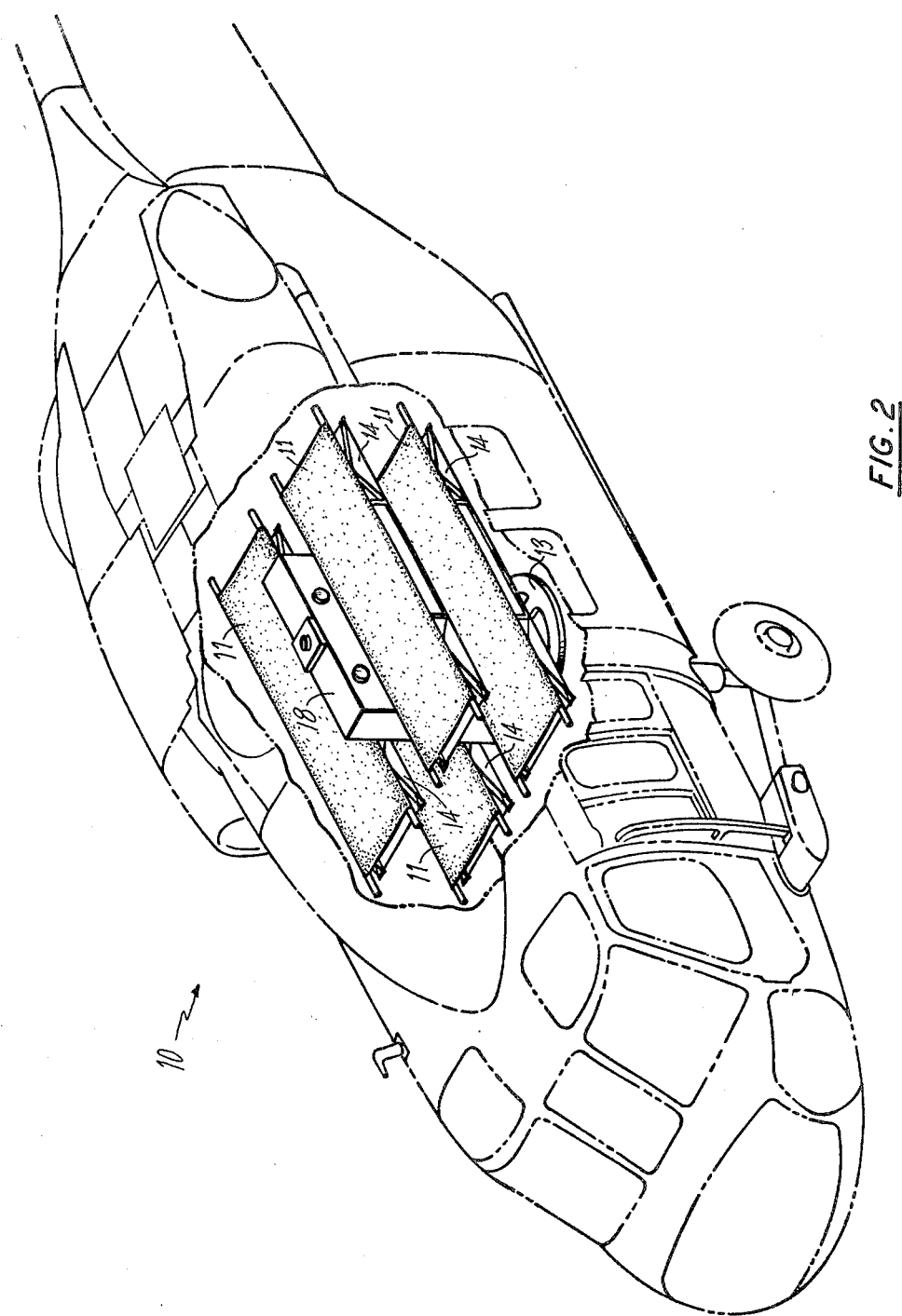
FIG. 2 corresponds to FIG. 1 but shows the litters and litter support means in transport mode.

Referring to FIGS. 1 and 2 we see air-ambulance 10, which may be either a helicopter or a fixed wing aircraft, and which in conventional fashion has loading port 12 on one or both sides of the aircraft so that patient litter bearers may approach the air-ambulance as illustrated and on-load litter 11 and patient onto the air-ambulance through the side port or doorway 12. The litter and patient may be off-loaded in similar fashion.

As shown in FIGS. 1 and 2, it may be desirable, but forms no part of this invention, to mount the litter support system on a rotatable turn-table or floor plate 13 in order to position the system laterally to receive litters through the side doors of the aircraft 10 and then to position the system longitudinally when loading is completed so as to permit closing of the side doors and allow crewmen to attend the patients. This litter support system is configured to accept standard litters 11 or stretchers which include four legs and dual handles at opposite ends for carrying. Litter supports 14 are shelf-like racks used both for supporting the litters 11 as in FIGS. 1 and 2 in their stowed positions and for guiding the legs of litters inserted at one end thereof as they are loaded and slid athwartship into their stowed position.

In the system depicted in FIGS. 1 and 2, all four litter supports 14 are side mounted to a center pedestal 18 which is in turn attached to the aircraft for 90° rotation by floor plate 13 and ceiling plate 20. Center pedestal 18 houses the crash attenuation and elevation apparatus for each of the four litter supports. In the configuration depicted in FIGS. 1 and 2, only the upper two litter supports 14 include means for elevation since the lower litter supports are at or just above floor level. It should be understood that more or less than four litter supports can be used, depending on the space abailable, both in width and height.

Figure 3:
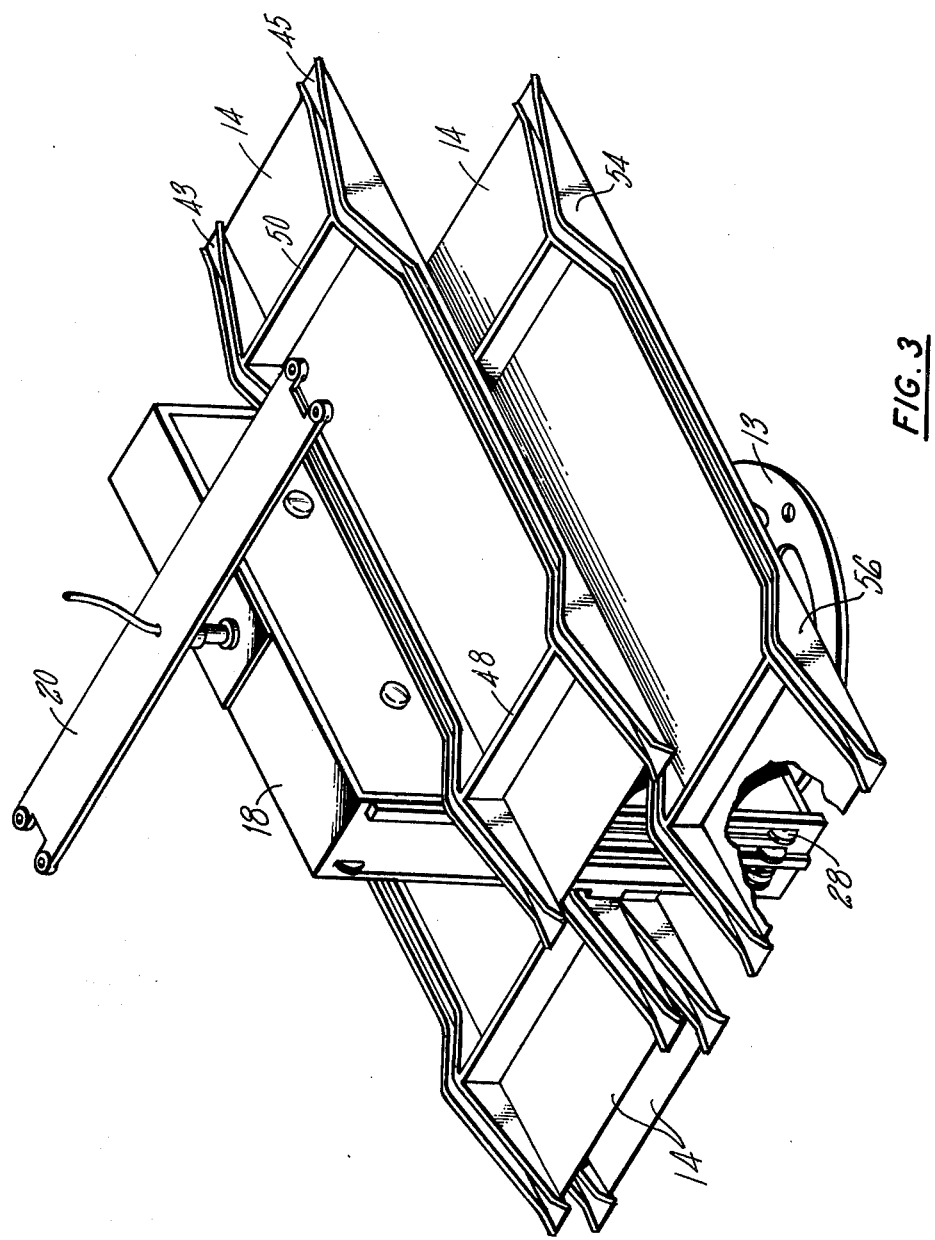
FIG. 3 is an isometric drawing of the litter support system depicted in FIGS. 1 and 2 wherein one of the upper litters is in a raised position and the other upper litter is in a lowered position for loading.
Figure 4:
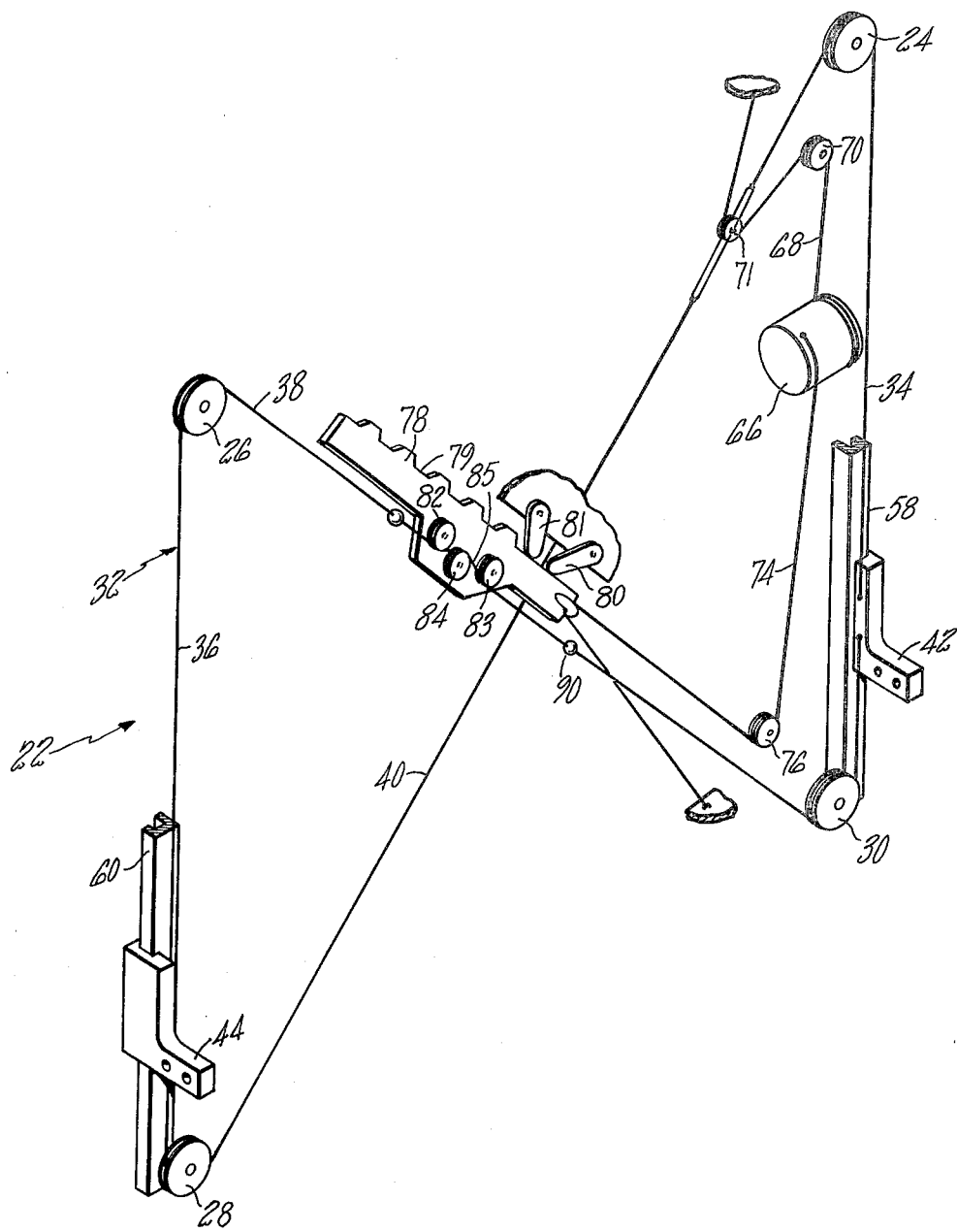
FIG. 4 is an isometric showing of the apparatus for synchronous raising or lowering of opposite ends of the litter support means, depicting the integrated attenuation feature.

The preferred embodiment of one of the litter support and elevating mechanism 22 is shown in FIGS. 3 and 4 in which four pulleys 24, 26, 28 and 30 are supported from pedestal 18. Pulleys 24 and 30 are in vertical orientation with respect to each other, as are pulleys 26 and 28. In addition, pulleys 24 and 26 are in horizontal orientation with respect to one another, as are pulleys 28 and 30. Continuous cable or wire system 32 is reeved over the four pulleys as shown in FIG. 4 to form a crossed-loop cable and pulley arrangement including vertically extending portions 34 and 36 extending between pulleys 30 and 24, 26 and 28, respectively. Crossed portions 38 and 40 extend between pulleys 28 and 24, 26 and 30, respectively. With cable 32 so reeved over the four pulleys, motion of cable 32 will produce synchronous vertical upward or downward motion of side portions 34 and 36. At least one set of litter rack brackets 42 and 44 are connected as shown to form part of continuous cable 32 and are in horizontal orientation with respect to each other so that a litter rack or support 14 extending thereacross will be in horizontal orientation at all times as cable portions 34 and 36 move vertically upwardly and downwardly synchronously. System 22 is self-balancing in that any excess force acting upon either bracket 42 or 44 is instantly transmitted by the cable 32 to the other bracket so that the horizontal attitude of the litter and patient is always maintained.

Preferably, as shown in FIG. 3, rigid litter rack or support 14 includes selectively spaced recesses 48 and 50 to receive for attachment thereto in any conventional fashion the horizontal legs of bracket members 42 and 44. Channels 43 and 45, as best shown in FIG. 3, serve as guide and support for the legs of the litter 11 as it is just placed in one end of rack 14 and slid therealong to the loaded position by a litter bearer. Preferably, the channels 43 and 45 have elevated portions on both sides thereof, as shown at 54 and 56, to provide lateral restraint to the legs of the litter 11.

As best shown in FIG. 4, brackets 42 and 44 are guided in vertically extending grooved rails 58 and 60, which may form part of frame 18.

Hoisting drum 66 is supported by pedestal 18 and may be driven by a hand crank or electric actuator, and serves to operate litter lowering cable 68 which is wrapped around drum 66 and passes over pulleys 70 and 71 to ground. Pulley 71 connects to continuous cable 32 so that rotation of drum 66 in a first direction will cause synchronous lowering of brackets 42 and 44 and therefore of the litter rack 14 and litter 11. Similarly, litter lifting cable 74 winds around drum 66 and extends therefrom over pulley 76, which is preferably supported from pedestal 18, and connects to continuous cable 32, preferably to rack member 78, which is connected to continuous cable 32 for motion therewith by means of roller sets 82, 83, and 84 to be described hereinafter. It will therefore be seen that with the litter rack 14 and litter 11 positioned on brackets 42 and 44, drum 66 may be usd to elevate or lower the rack and litter.

When the litter 11 and rack 14 are brought to their desired position of elevation, system 22 and hence the litter 11 may be locked in position from up and down motion by pivotable locking pawls 80 and 81, which are supported for pivot motion from any fixed point in the aircraft and are brought into engagement with two of the locking slots, such as 79, of rack 78 to thereby lock the system in the selected elevated position.

A very important feature of this invention is that if the air-ambulance 10 experiences a hard landing or a down-crash, or possible severe turbulence, shock absorption and force attenuation protection is provided to the patient and the litter bearing equipment by means integrated with the synchronous litter elevating mechanism. As best shown in FIG. 4, roller members 82 and 83 are offset from roller member 84. Cable 32, or preferably a deformable strip portion 85 thereof, is reeved through these staggered rollers. Each of these rollers is supported from rack 78 so as to travel therewith during the normal litter elevating, lowering and transporting operation. These rollers are selectively sized and positioned so that with cable 32 reeved therethrough as shown in FIG. 4, the rack member 78 and cable 32 travel together. If the air-ambulance 10 experiences a hard landing or a down-crash, when a given G-force is experienced and the rack 78 is locked to the aircraft by pawls 80 and 81, the downward loading of the litter, patient and rack on brackets 42 and 44 will cause cable 32 to reeve through the offset rollers 82–84, which are stationary because of the locked condition of rack 78 to thereby produce a discrete, multiple flexure in the wire or cable 32 and hence provide shock absorption and force attenuation to protect the patient and the equipment. This movement of cable 32 will result in brackets 42 and 44, with rack 14 and litter 11, moving vertically downwardly a selected distance, whereupon it will again become fixed in position due to the friction of the FIG. 4 arrangement when the crash created or other large scale force has been attenuated or when swaged ball stop 90 contacts the lower pulley 83. The force attenuating subsystem of FIG. 4 operates by transferring the kinetic energy imparted to the litter rack 14 by a crash condition to the continuous cable 32, which gradually and discretely dissipates this kinetic energy as it is pulled through the offset rollers 82–84 which thereby subjects the cable to continuous bending strain reversal. It will be obvious to those skilled in the art that the degree of crash attenuating motion of the brackets, rack and litter can be controlled at a given G load by the construction and location of the offset attenuator rollers 82–84. Further, the force attenuation subsystem shown in FIG. 4 is bi-directional and will perform similarly if a large scale upward force is imparted on the litter. Lift system, 66–67, being isolated from the attenuation system, may accordingly be of light construction.

OPERATION

During the operation of on-loading litters and patients onto the air-amublance, the litters are side loaded as shown in FIG. 1 so that the leading end thereof is received in litter rack 14 shown in FIG. 3 and then slid by the rear litter bearer into a fully loaded position, the litter rack 14 having already been attached to brackets 42 and 44 and those brackets positioned at the desired loading elevation. With the litter so loaded, drum 66 may be turned to synchronously elevate the litter into the desired position of elevation and locked. A second litter may be similarly loaded onto corresponding members 42, 44 and 14 below the first elevated litter and similarly elevated and locked using its own system corresponding to 22 of FIG. 4. Depending upon the space available, this second loaded litter possibly need not be elevated but could enjoy the same force attenuation protection as the first litter, or the second litter could be placed on the aircraft floor. Litters are similarly loaded on the other side of support 18. With all litters so loaded, in lazy susan fashion, the center pedestal 18 can be rotated to the fore-and-aft orientation shown in FIG. 2. The side loading ports 12 may then be closed, if desired, and flight of the air-ambulance commenced.

The reverse procedure is used for off-loading.

I wish it to be understood that I do not desire to be limited to the exact details of construction shown and described, for obvious modifications will occur to a person skilled in the art.

I claim:

1. Litter elevating and lowering apparatus adapted for use in an air-ambulance comprising:
   (A) a pulley-cable defining a continuous cable having two selectively spaced vertical oriented portions and two crossed portions connecting the vertical portions so that motion of the cable over the pulleys will cause the vertical portions to move vertically upwardly and downwardly synchronously,
   (B) litter support means connected to said cable vertical portions to provide level support for a patient bearing litter and for synchronous vertical litter motion with said cable vertical portions,
   (C) means to cause said continuous cable to move over said pulleys to cause said litter support means to be either elevated or lowered synchronously,
   (D) locking means to lock said cable against motion with said litter support means in a selected position of elevation and,
   (E) crash attenuating means operatively associated with said continuous cable to permit said cable side portions and hence said litter support means to move gently a selected vertical distance in response to a preselected G-level load imposed thereon by a down-crash or other force to thereby attenuate the force and spare the patient the full impact of the down-crash load and prevent cable rupture as a result thereof.

2. Litter apparatus as in claim 1 and wherein said pulley-cable means comprises four pulley members supported at the four corners of a rectangle and a continuous cable reeved therearound in crossed-loop fashion.

3. Litter apparatus according to claim 2 and wherein said litter support means comprises an L-shaped bracket having one leg thereof connected to and movable with each cable vertical portions and the other leg thereof extending perpendicular thereto to provide a horizontal platform for a patient litter.

4. A litter apparatus according to claim 3 wherein said locking means comprises a slotted rack member connected to and movable with one of said cable crossed portions, and a fixed pawl operable to engage a selected one of said rack slots to lock the litter support means in a selected position of elevation.

5. A litter apparatus according to claim 4 and wherein said crash attenuating means comprises a plurality of misaligned rollers connected to said rack member and having a portion of said continuous cable crossed portion reeved therethrough so that said rack and rollers normally move with said cable during litter support means elevating, lowering and transporting operation and, further, so that, with said rack locked in position and when the air-ambulance experiences a heavy force, such as a down-crash, the kinetic energy imparted to the litter support means thereby will cause the cable to be pulled through the fixed, misaligned rollers to thereby subject the cables to continuous bending stress reversals to gently dissipate the kinetic energy to thereby perform a shock absorbing function for the patient and apparatus.

6. Litter apparatus according to claim 5 and including means to support said pulley-cable means to be pivotable between an athwartship on-loading position to a fore-and-aft transport position.

7. Litter apparatus accordng to claim 5 wherein said crash attenuation means is operable to attenuate both an excessive force directed to elevate the litter support means and to lower the litter support means.

8. Litter apparatus according to claim 7 and including vertically extending grooved support rails operatively connected to said litter support means to guide same in vertical motion.

9. Litter apparatus according to claim 1 wherein said support means elevating and lowering means is load isolated from said crash attenuation means.

* * * * *